United States Patent
Akiyama et al.

(10) Patent No.: US 7,998,454 B2
(45) Date of Patent: Aug. 16, 2011

(54) METHOD OF PRODUCING MAGNESIUM-BASED HYDRIDES AND APPARATUS FOR PRODUCING MAGNESIUM-BASED HYDRIDES

(75) Inventors: Tomohiro Akiyama, Sendai (JP); Kouwa Cho, Sapporo (JP); Masahito Satoh, Sapporo (JP); Haruya Hayashi, Sapporo (JP); Taketo Hiraki, Sapporo (JP); Itoko Saita, Sapporo (JP); Hiroshi Uesugi, Sapporo (JP)

(73) Assignees: Bio Coke Lab. Co. Ltd., Yokohama-Shi (JP); Tomohiro Akiyama, Sendai-Shi (JP)

( * ) Notice: Subject to any disclaimer, the term of this patent is extended or adjusted under 35 U.S.C. 154(b) by 494 days.

(21) Appl. No.: 12/149,726

(22) Filed: May 7, 2008

(65) Prior Publication Data

US 2008/0279762 A1    Nov. 13, 2008

(30) Foreign Application Priority Data

May 10, 2007  (JP) .................................. 2007-125866

(51) Int. Cl.
*C01B 6/04* (2006.01)
(52) U.S. Cl. ....................................................... 423/647
(58) Field of Classification Search ................. 423/647; 420/900
See application file for complete search history.

(56) References Cited

U.S. PATENT DOCUMENTS
2005/0126663 A1 *  6/2005  Fetcenko et al. .............. 148/420

FOREIGN PATENT DOCUMENTS

| JP | 51-33789 | | 3/1976 |
|---|---|---|---|
| JP | 54-126688 | A | 10/1979 |
| JP | 61-253309 | A2 | 11/1986 |
| JP | 62-20809 | A2 | 1/1987 |
| JP | 1-247513 | A | 10/1989 |
| JP | 4-265201 | A | 9/1992 |
| JP | 6-170223 | A | 6/1994 |
| JP | 06170223 | A * | 6/1994 |
| JP | 10-255783 | A | 9/1998 |
| JP | 2001-266865 | A | 9/2001 |
| JP | 2002-146449 | A | 5/2002 |
| JP | 2002-309331 | A | 10/2002 |
| JP | 2003-147419 | A2 | 5/2003 |
| JP | 2003-212501 | A | 7/2003 |
| JP | 2003-527281 | A | 9/2003 |
| JP | 2004-512254 | A | 4/2004 |

* cited by examiner

*Primary Examiner* — Wayne Langel
*Assistant Examiner* — Syed Iqbal
(74) *Attorney, Agent, or Firm* — Birch, Stewart, Kolasch & Birch, LLP

(57) ABSTRACT

A first heat treatment is carried out in which a material powder comprising magnesium is kept in the atmosphere of hydrogen gas and the temperature and pressure in the atmosphere of hydrogen gas are maintained in the temperature-pressure region in which single Mg and $H_2$ coexist in a thermodynamically stable state, whereby the coating on the surface of the material powder is removed. Next, a second heat treatment is carried out in which the temperature and pressure in the atmosphere of hydrogen gas are changed and maintained in the temperature-pressure region in which $MgH_2$ exists in a thermodynamically stable state. Hence, Mg from which the coating is removed reacts promptly with $H_2$, and $MgH_2$ is produced at high yield. Magnesium-based hydrides containing high purity $MgH_2$ can thus be obtained by supplying energy less than that required for the related art that requires an activation treatment.

8 Claims, 14 Drawing Sheets

F I G. 1
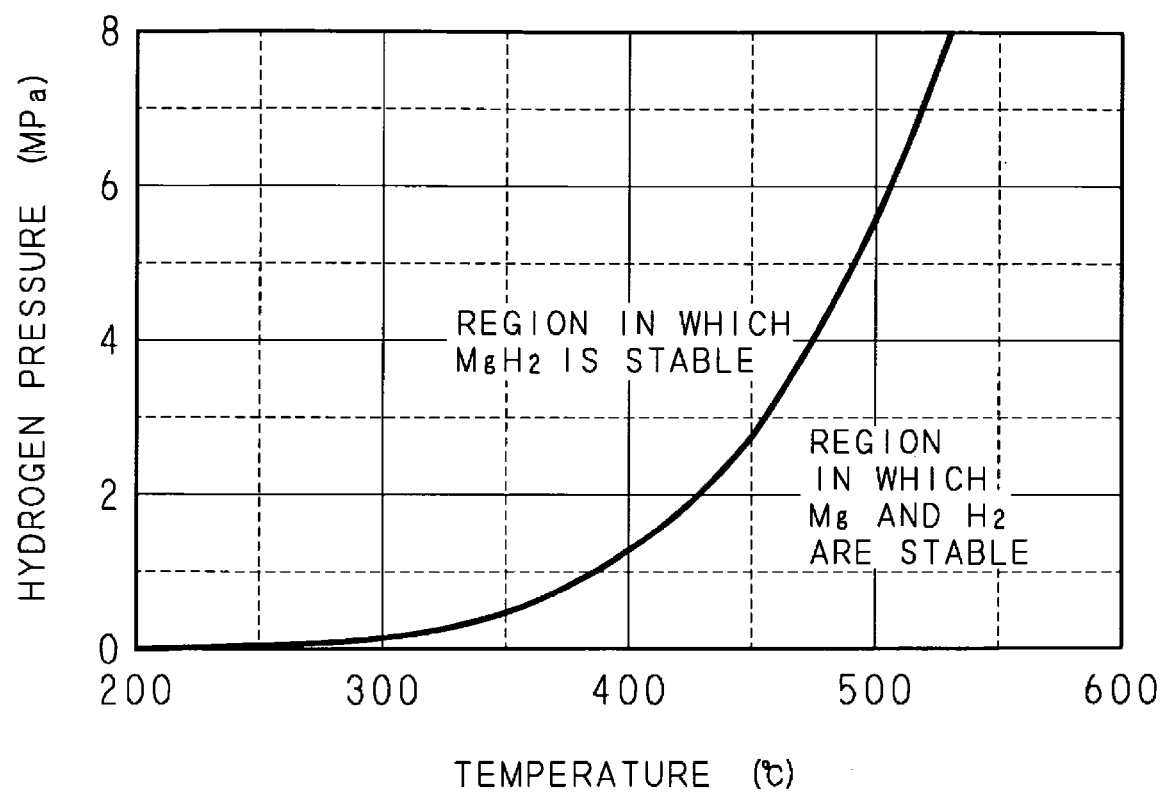

F I G. 3

FIRST EXAMPLE (AT 40 ATMS)

| SAMPLE | FIRST HEAT TREATMENT 550°C, 1 HOUR | SECOND HEAT TREATMENT 400°C, 20 HOURS | MECHANICAL GRINDING/ MIXING | FIRST HEAT TREATMENT (SECOND TIME) | SECOND HEAT TREATMENT (SECOND TIME) |
|---|---|---|---|---|---|
| M0 | × | ○ | | | |
| M1 | ○ | ○ | × | × | × |
| M2 | ○ | ○ | ○ | × | × |
| M3 | ○ | ○ | ○ | ○ | ○ |

F I G. 4
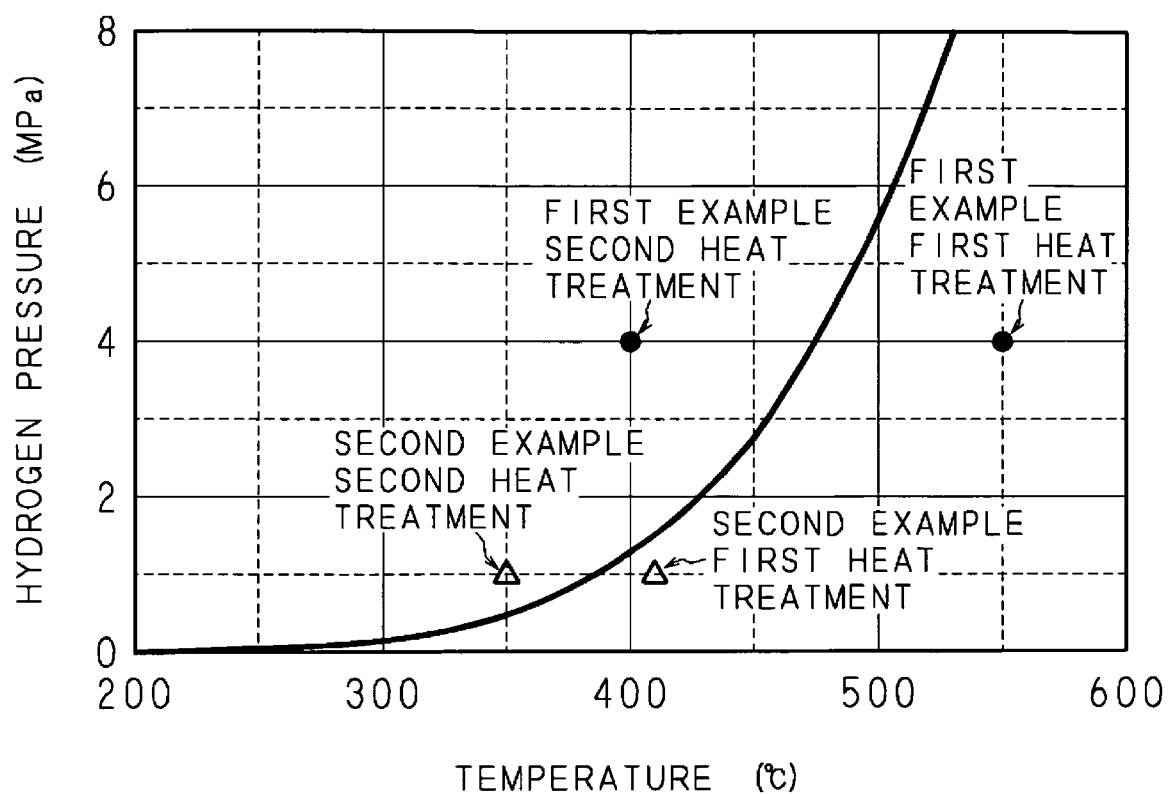

F I G. 7
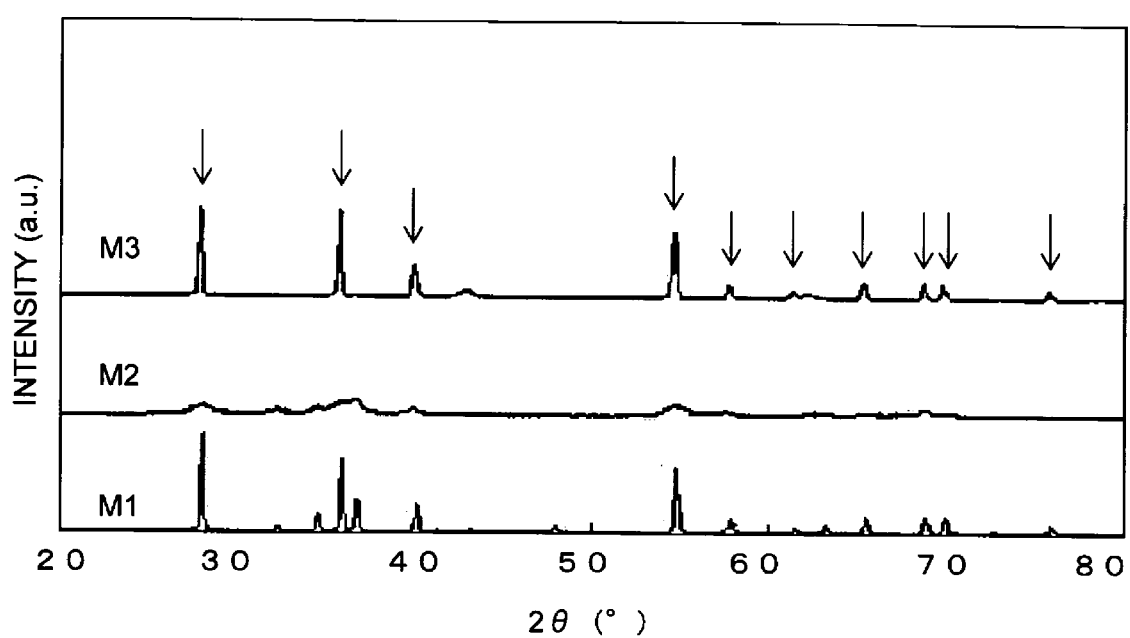

FIG. 8

| SAMPLE | MgH$_2$ | Mg | TOTAL |
|---|---|---|---|
| M0 | NEARLY 0 | NEARLY 100 | 100.0 |
| M1 | 75.5 | 24.5 | 100.0 |
| M2 | UNANALIZABLE BECAUSE OF FORMATION OF AMORPHOUS STRUCTURE | | |
| M3 | 97.0 | 3.0 | 100.0 |

F I G. 9

SECOND EXAMPLE (AT 10 ATMS)

| SAMPLE | FIRST HEAT TREATMENT | SECOND HEAT TREATMENT | PURITY (%) |
|---|---|---|---|
| N1 | 410°C, 1 HOUR | 350°C, 5 HOURS | 94 |
| N2 | 410°C, 1 HOUR | 350°C, 7 HOURS | 95 |

F I G. 10

| $Mg_3N_2 + 3H_2 \rightarrow 3Mg + 2NH_3$ | | | | | |
|---|---|---|---|---|---|
| T (°C) | ΔH (kcal) | ΔS (cal/K) | ΔG (kcal) | K | Log(K) |
| 0.000 | 88.589 | 1.653 | 88.138 | 2.980E-071 | -70.526 |
| 100.000 | 87.642 | -1.315 | 88.133 | 2.385E-052 | -51.623 |
| 200.000 | 86.827 | -3.255 | 88.367 | 1.512E-041 | -40.820 |
| 300.000 | 86.109 | -4.635 | 88.765 | 1.412E-034 | -33.850 |
| 400.000 | 85.476 | -5.654 | 89.282 | 1.025E-029 | -28.989 |
| 500.000 | 84.932 | -6.409 | 89.887 | 3.882E-026 | -25.411 |
| 600.000 | 84.430 | -7.023 | 90.562 | 2.140E-023 | -22.670 |
| 700.000 | 90.337 | -0.626 | 90.946 | 3.747E-021 | -20.426 |
| 800.000 | 90.025 | -0.924 | 91.017 | 2.902E-019 | -18.537 |
| 900.000 | 90.255 | -0.720 | 91.100 | 1.065E-017 | -16.973 |
| 1000.000 | 90.585 | -0.451 | 91.159 | 2.241E-016 | -15.650 |

FIG. 11

| $Mg_3N_2$ | + | $3H_2$ | → | $3MgH_2$ | + | $N_2$ | |
|---|---|---|---|---|---|---|---|
| T (°C) | ΔH (kcal) | | ΔS (cal/K) | | ΔG (kcal) | K | Log(K) |
| 0.000 | 56.314 | | -45.503 | | 68.743 | 9.844E-056 | -55.007 |
| 100.000 | 55.103 | | -49.293 | | 73.497 | 8.917E-044 | -43.050 |
| 200.000 | 54.044 | | -51.815 | | 78.560 | 5.127E-037 | -36.290 |
| 300.000 | 53.124 | | -53.582 | | 83.835 | 1.072E-032 | -31.970 |
| 400.000 | 63.832 | | -35.827 | | 87.949 | 2.777E-029 | -28.556 |
| 500.000 | 64.949 | | -34.278 | | 91.451 | 1.403E-026 | -25.853 |
| 600.000 | 65.892 | | -33.130 | | 94.820 | 1.838E-024 | -23.736 |
| 700.000 | 66.885 | | -32.053 | | 98.077 | 9.375E-023 | -22.028 |
| 800.000 | 67.573 | | -31.373 | | 101.241 | 2.401E-021 | -20.620 |
| 900.000 | 68.679 | | -30.387 | | 104.328 | 3.654E-020 | -19.437 |
| 1000.000 | 69.770 | | -29.495 | | 107.321 | 3.764E-019 | -18.424 |

F I G. 12

| MgO | + | H$_2$ | → | Mg | + | H$_2$O | | |
|---|---|---|---|---|---|---|---|---|
| T (°C) | | ΔH (kcal) | | ΔS (cal/K) | | ΔG (kcal) | K | Log(K) |
| 0.000 | | 73.827 | | -19.164 | | 79.062 | 5.452E-064 | -63.263 |
| 100.000 | | 76.051 | | -11.441 | | 80.320 | 8.981E-048 | -47.047 |
| 200.000 | | 76.822 | | -9.615 | | 81.371 | 2.578E-038 | -37.589 |
| 300.000 | | 77.808 | | -7.736 | | 82.242 | 4.339E-032 | -31.363 |
| 400.000 | | 79.398 | | -5.185 | | 82.889 | 1.220E-027 | -26.913 |
| 500.000 | | 81.043 | | -2.908 | | 83.291 | 2.844E-024 | -23.546 |
| 600.000 | | 82.688 | | -0.906 | | 83.479 | 1.269E-021 | -20.897 |
| 700.000 | | 86.388 | | 3.103 | | 83.368 | 1.886E-019 | -18.724 |
| 800.000 | | 88.065 | | 4.744 | | 82.974 | 1.261E-017 | -16.899 |
| 900.000 | | 89.720 | | 6.218 | | 82.425 | 4.401E-016 | -15.356 |
| 1000.000 | | 91.352 | | 7.554 | | 81.735 | 9.292E-015 | -14.032 |

F I G. 13

| $2MgO + 2H_2 \rightarrow 2MgH_2 + O_2$ | | | | | |
|---|---|---|---|---|---|
| T (°C) | ΔH (kcal) | ΔS (cal/K) | ΔG (kcal) | K | Log(K) |
| 0.000 | 251.554 | -10.812 | 254.507 | 2.235E-204 | -203.651 |
| 100.000 | 250.758 | -13.283 | 255.715 | 1.653E-150 | -149.782 |
| 200.000 | 249.929 | -15.254 | 257.146 | 1.634E-119 | -118.787 |
| 300.000 | 249.167 | -16.718 | 258.749 | 2.125E-099 | -98.673 |
| 400.000 | 256.170 | -5.099 | 259.602 | 5.112E-085 | -84.291 |
| 500.000 | 256.811 | -4.211 | 260.066 | 3.018E-074 | -73.520 |
| 600.000 | 257.409 | -3.482 | 260.450 | 6.366E-066 | -65.196 |
| 700.000 | 257.970 | -2.874 | 260.767 | 2.705E-059 | -58.568 |
| 800.000 | 258.494 | -2.362 | 261.028 | 6.864E-054 | -53.163 |
| 900.000 | 258.982 | -1.926 | 261.242 | 2.130E-049 | -48.672 |
| 1000.000 | 259.435 | -1.556 | 261.415 | 1.323E-045 | -44.878 |

FIG. 14

| SAMPLE NAME | N CONTENT IN Mg A | MAXIM NH₃ CONCENTRATION IN H₂ B | pH INSIDE WATER-SEALED BATH BEFORE | pH INSIDE WATER-SEALED BATH AFTER | NH₃ CONCENTRATIONS IN H₂ C | AMOUNT OF REMOVED N B−C | REMOVAL RATIO OF N (B−C)/B |
|---|---|---|---|---|---|---|---|
| POWDER SAMPLE E | 33 ppm | 26.4 ppm | 6.19 | 8.61 | 19.5 ppm | 6.9 ppm | 26% |
|  |  |  | 5.84 | 8.64 | 21.0 ppm | 5.4 ppm | 20% |
| POWDER SAMPLE C | 8 ppm | 6.4 ppm | 5.9 | 7.86 | 3.5 ppm | 2.9 ppm | 45% |
|  |  |  | 5.57 | 7.6 | 1.9 ppm | 4.5 ppm | 70% |

METHOD OF PRODUCING MAGNESIUM-BASED HYDRIDES AND APPARATUS FOR PRODUCING MAGNESIUM-BASED HYDRIDES

CROSS-REFERENCE TO RELATED APPLICATION

This non-provisional application claims priority under 35 U.S.C. §119(a) on Patent Application No. 2007-125866 filed in Japan on May 10, 2007, the entire contents of which are hereby incorporated by reference.

BACKGROUND

1. Technical Field

The present invention relates to a method of producing magnesium-based hydrides that generate hydrogen when reacted with water, more particularly, to a method of producing magnesium-based hydrides and an apparatus for producing magnesium-based hydrides, capable of producing magnesium-based hydrides from materials at high yield.

2. Description of the Related Art

Like an alkali metal hydride, magnesium hydride $MgH_2$ is an ionic bond hydride formed of the bonding of $Mg^{2+}$ and $H^-$ and is formed by reacting magnesium Mg with high pressure hydrogen under heating. The reaction for forming $MgH_2$ is represented by the following formula (1).

$$Mg + H_2 \rightarrow MgH_2 \quad (1)$$

The powder of $MgH_2$ is charcoal gray in color and stable in air. However, when it is in water, it reacts with water and decomposes while releasing hydrogen. Hence, it is expected that $MgH_2$ can be used as a hydrogen storage material that releases hydrogen by causing $MgH_2$ to store hydrogen in advance and by reacting $MgH_2$ with water as necessary. The reaction of $MgH_2$ with water is represented by the following formula (2).

$$MgH_2 + 2H_2O \rightarrow Mg(OH)_2 + 2H_2 \quad (2)$$

The powder of Mg reacts with hydrogen in the temperature range of 250 to 400° C. and is hydrogenated gradually. It is thus difficult to completely hydrogenate Mg by carrying out heating and high-pressure treatment only once. For this reason, in order that the hydrogenation of Mg is accelerated, Mg is hydrogenated to some extent to cause Mg to absorb hydrogen. Then, Mg is heated once under reduced pressure to release hydrogen. This hydrogen absorption/release operation is repeated ten or more times. The "activation treatment" described above is usually necessary for the hydrogenation.

Furthermore, usually, the surface of Mg is oxidized, and an oxide coating of MgO or $Mg(OH)_2$ or a nitride coating is formed thereon, whereby the initial hydrogen-absorption rate of Mg is low. Hence, a method of improving the efficiency for Mg to absorb hydrogen by adding a substance having an effective catalytic action for initial activation and hydrogen absorption to Mg has been proposed. As substances having the catalytic action, $I_2$, Ni, Cu, etc. are known. In addition, Patent document 1 has disclosed an art of improving the efficiency of absorbing hydrogen by causing the surface and inside of granular Mg to contain metal particles having the catalytic action, such as Ni particles.

[Patent document 1] Japanese Patent Application Laid-Open Publication No. 2003-212501

However, even when $MgH_2$ is produced from Mg while the activation treatment is carried out, since the diffusion rate of hydrogen in Mg is low, it is difficult to produce high purity $MgH_2$. A small amount of $MgH_2$ having a purity of approximately 95% is produced at present. The longer the activation treatment is continued, the more the yield of $MgH_2$ is improved. However, the energy supplied to produce $MgH_2$ increases, and there is a problem that the energy cost of $MgH_2$ is high. Furthermore, although the yield of magnesium-based hydrides containing $MgH_2$ is improved by adding the substance having the catalytic action to Mg, the recycle treatment of waste after hydrogen is generated from the magnesium-based hydrides becomes difficult. Hence, it is desirable that the amount of the additive should be small.

SUMMARY

The present invention is contrived in consideration of these circumstances. The present invention is intended to provide a method of producing magnesium-based hydrides and an apparatus for producing magnesium-based hydrides, capable of reducing energy supplied to produce magnesium-based hydrides.

The method of producing magnesium-based hydrides comprises keeping a material powder comprising magnesium in the atmosphere of hydrogen gas; removing the coating from the surface of the material powder by maintaining the temperature and pressure in the atmosphere of hydrogen gas in the temperature-pressure region in which single magnesium and a hydrogen molecule coexist in a thermodynamically stable state; and producing magnesium-based hydrides from the material powder by maintaining the temperature and pressure in the atmosphere of hydrogen gas in the temperature-pressure region in which the magnesium hydride obtained by the combination of the single magnesium with the hydrogen molecule exists in a thermodynamically stable state.

This summary does not purport to define the invention. The invention is defined by the claims.

The above and further objects and features of the invention will more fully be apparent from the following detailed description with accompanying drawings.

BRIEF DESCRIPTION OF THE SEVERAL VIEWS OF THE DRAWINGS

FIG. 1 is a simplified equilibrium diagram between magnesium and hydrogen in the atmosphere of hydrogen gas:

FIG. 3 is a table showing treatments carried out for samples in a first example;

FIG. 4 is a characteristic diagram showing the temperature and pressure conditions of the example in the equilibrium diagram shown in FIG. 1;

FIG. 7 is a characteristic diagram showing the results of the X-ray diffraction analysis of the magnesium-based hydrides produced in the example;

FIG. 8 is a table indicating the amounts of $MgH_2$ contained in the magnesium-based hydrides of the respective samples;

FIG. 9 is a table showing treatments carried out for samples in a second example;

FIG. 10 is a table showing the results of the theoretical calculations performed to obtain the free energy change $\Delta G$ and the equilibrium constant K in each reaction at each temperature;

FIG. 11 is a table showing the results of the theoretical calculations performed to obtain the free energy change ΔG and the equilibrium constant K in each reaction at each temperature;

FIG. 12 is a table showing the results of the theoretical calculations performed to obtain the free energy change ΔG and the equilibrium constant K in each reaction at each temperature;

FIG. 13 is a table showing the results of the theoretical calculations performed to obtain the free energy change ΔG and the equilibrium constant K in each reaction at each temperature; and FIG. 14 is a table showing the results of an experiment.

DETAILED DESCRIPTION

Figure 2:
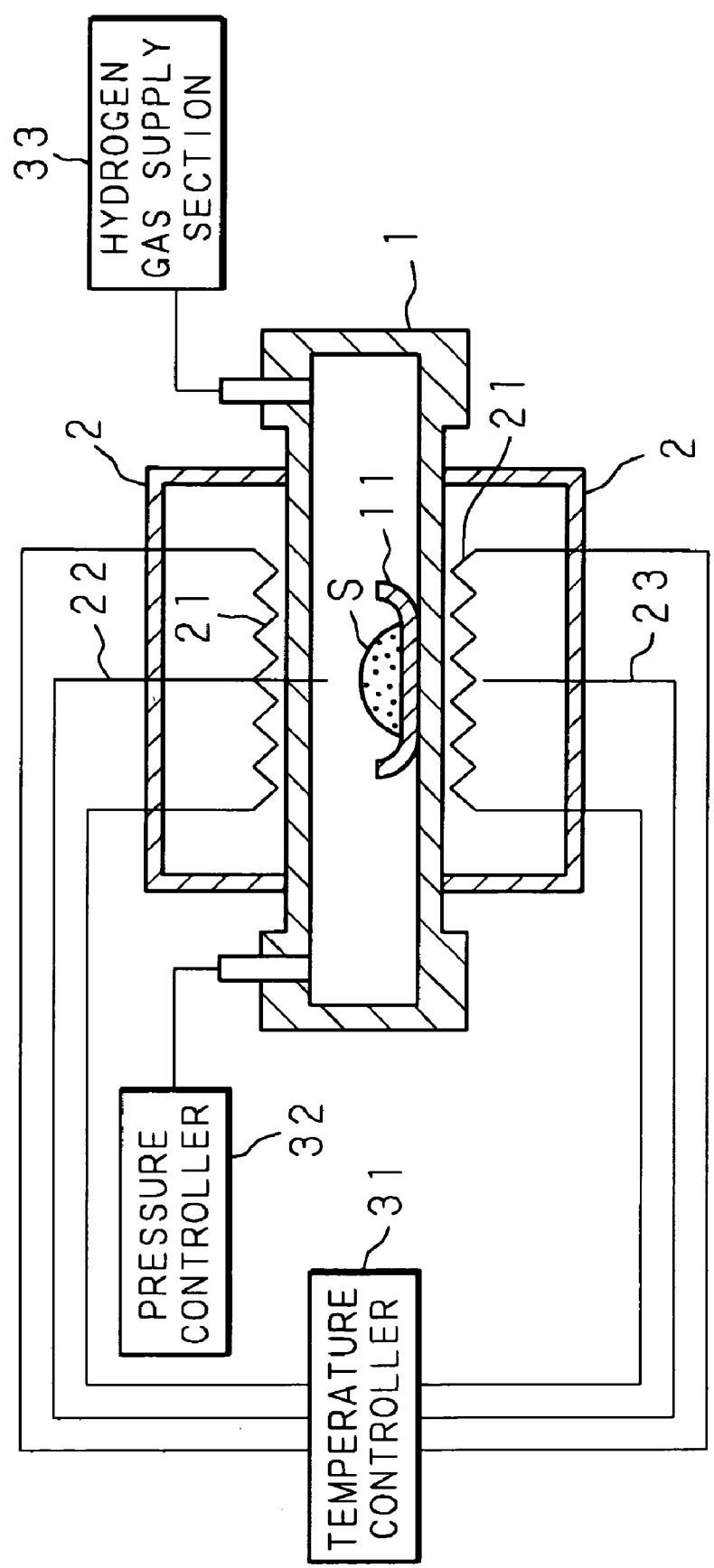
FIG. 2 is a schematic view showing a configuration example of an apparatus for producing magnesium-based hydrides.

FIG. 1 is a simplified equilibrium diagram between magnesium and hydrogen in the atmosphere of hydrogen gas. The horizontal axis of the diagram represents the temperature in the atmosphere of hydrogen gas, and the vertical axis represents the pressure in the atmosphere of hydrogen gas. The reaction represented by the formula (1) in which Mg (single magnesium) and $H_2$ (hydrogen molecule) are combined to form $MgH_2$ (magnesium hydride) is a reversible reaction, and there is a reverse reaction in which $MgH_2$ is decomposed into Mg and $H_2$. The curve shown in FIG. 1 is a curve indicating the equilibrium between the reaction in which Mg and $H_2$ are combined to form $MgH_2$ and the reverse reaction thereof. Under the temperature and pressure conditions on the equilibrium curve, the reaction rate of the reaction represented by the formula (1) becomes equal to the reaction rate of the reverse reaction. The equilibrium curve shown in FIG. 1 in the atmosphere of hydrogen gas is obtained from a thermodynamic theory. The temperature-pressure region in the atmosphere of hydrogen gas is divided by the equilibrium curve.

In the temperature-pressure region on the right side of the equilibrium curve shown in FIG. 1, the reaction in which $MgH_2$ is decomposed into Mg and $H_2$ is more dominant than the reaction in which Mg and $H_2$ are combined to form $MgH_2$. In other words, in the temperature-pressure region, Mg and $H_2$ coexist in a thermodynamically stable state. On the other hand, in the other temperature-pressure region on the left side of the equilibrium curve shown in FIG. 1, the reaction in which Mg and $H_2$ are combined to form $MgH_2$ is more dominant than the reaction in which $MgH_2$ is decomposed. In other words, in the temperature-pressure region, $MgH_2$ exists in a thermodynamically stable state. For example, when the pressure in the atmosphere of hydrogen gas is maintained constant, $MgH_2$ is decomposed on the high temperature side, and $MgH_2$ is formed on the low temperature side. Furthermore, when the temperature in the atmosphere of hydrogen gas is maintained constant, $MgH_2$ is decomposed on the low pressure side, and $MgH_2$ is formed on the high pressure side. In the related art, $MgH_2$ has been produced in the temperature-pressure region in which $MgH_2$ exists in a thermally stable state.

In this embodiment, the temperature and pressure in the atmosphere of hydrogen gas are maintained once in the temperature-pressure region in which $MgH_2$ is decomposed and Mg and $H_2$ coexist in a thermodynamically stable state. Then, the temperature and pressure in the atmosphere of hydrogen gas are changed into the temperature-pressure region in which $MgH_2$ exists in a thermodynamically stable state, whereby $MgH_2$ is produced. As described above, the surface of Mg is oxidized and coated with MgO or $Mg(OH)_2$, and this coating of MgO or $Mg(OH)_2$ prevents the reaction between Mg and $H_2$. In the temperature-pressure region in which Mg and $H_2$ coexist in a thermodynamically stable state, $Mg(OH)_2$ is thermally decomposed to form MgO, and MgO is reduced with a hydrogen molecule. The thermal decomposition of $Mg(OH)_2$ and the reduction of MgO are represented by the following formulas (3) and (4), respectively.

$$Mg(OH)_2 \rightarrow MgO + H_2O \quad (3)$$

$$MgO + H_2 \rightarrow Mg + H_2O \quad (4)$$

The coating on the surface of Mg is removed by the thermal decomposition of $Mg(OH)_2$ and the reduction of MgO with a hydrogen molecule, and Mg can promptly react with $H_2$. The temperature and pressure in the atmosphere of hydrogen gas are changed from the temperature-pressure region in which Mg and $H_2$ coexist in a thermodynamically stable state into the temperature-pressure region in which $MgH_2$ exists in a thermodynamically stable state. Hence, the reaction in which Mg and $H_2$ are combined to form $MgH_2$ proceeds promptly without hindered by the coating. As a result, high purity $MgH_2$ can be obtained. The temperature and pressure in the atmosphere of hydrogen gas are maintained once in the temperature-pressure region in which Mg and $H_2$ coexist in a thermodynamically stable state. Next, the temperature and pressure are changed into the temperature-pressure region in which $MgH_2$ exists in a thermodynamically stable state. In the above-mentioned method according to this embodiment, high purity $MgH_2$ can be obtained by supplying energy less than that required for the related art that requires the activation treatment in which the absorption and release of hydrogen are repeated by the repetition of heating and cooling.

FIG. 2 is a schematic view showing a configuration example of an apparatus for producing magnesium-based hydrides. In the production apparatus, a sealing container 1 capable of sealing a material powder comprising magnesium as a main material and high-pressure hydrogen gas is disposed inside a heating furnace 2. The sealing container 1 is a pressure-resistant container in which the inside atmosphere can be maintained at high temperature and high pressure. The sealing container 1 is inside equipped with a sample tray 11, and sample S can be placed on the sample tray 11. Furthermore, a hydrogen gas supply section 33 including a high-pressure hydrogen cylinder and a pressure regulator, etc. is provided for supplying high-pressure hydrogen gas inside the sealing container 1. Moreover, the sealing container 1 is provided with a pressure controller 32 comprising a pressure reducing device, a pressurizing device, a pressure sensor, a timer, a microcontroller, a memory in which programs for carrying out pressure control are stored, etc. and capable of controlling the pressure in the atmosphere of hydrogen gas inside the sealing container 1 to the desired pressure.

The heating furnace 2 is equipped with heaters 21 and 21 for heating the interior of the heating furnace 2, a temperature sensor 22 for detecting the temperature inside the sealing container 1, and a temperature sensor 23 for detecting the temperature outside the sealing container 1. Thermocouples, for example, are used for the temperature sensors 22 and 23. The heaters 21 and 21 and the temperature sensors 22 and 23 are connected to a temperature controller 31 comprising a power supply for supplying heating current to the heaters 21 and 21, a timer, a microcontroller, a memory in which programs for carrying out temperature control are stored, etc. The temperature controller 31 can control the temperature inside the sealing container 1 to the desired temperature. Although the temperature sensors 22 and 23 are each shown as one temperature sensor in FIG. 2, the production apparatus is usually equipped with multiple temperature sensors serving as each of the temperature sensors 22 and 23. The temperature controller 31 carries out temperature control on the basis of the detection results of the multiple temperature sensors 22 and 23. The temperature controller 31 and the pressure controller 32 control the temperature and pressure inside the sealing container 1 to the predetermined values according to the programs stored in the memories.

Next, examples will be described below. Mg having a purity of 99.9 wt % was mechanically ground and mixed using a supersonic homogenizer or a ball mill to form a material powder. This material powder was placed as sample S on the sample tray 11 inside the sealing container 1 shown in FIG. 2. Then, hydrogen gas was supplied from a hydrogen gas supply section 33 into the sealing container 1, and the material powder comprising magnesium as a main material was sealed into the atmosphere of hydrogen gas. The temperature in the atmosphere of hydrogen gas inside the sealing container 1 was controlled using the temperature controller 31, and the pressure in the atmosphere of hydrogen gas was controlled using the pressure controller 32.

FIG. 3 is a table showing treatments carried out for samples in a first example. The treatments carried out for the respective samples are each indicated by "○" mark, and the treatments not carried out are each indicated by "x" mark. Material powders equivalent to one another were used as the material powders for samples M0 to M3. The treatment in which the temperature and pressure in the atmosphere of hydrogen gas are maintained in the temperature-pressure region in which Mg and $H_2$ coexist in a thermodynamically stable state is herein referred to as first heat treatment. Furthermore, the treatment in which the temperature and pressure in the atmosphere of hydrogen gas are maintained in the temperature-pressure region in which $MgH_2$ exists in a thermodynamically stable state is referred to as second heat treatment. In this example, the first heat treatment was carried out for a predetermined time by maintaining the temperature in a high-temperature region in which Mg and $H_2$ coexist in a thermodynamically stable state and the second treatment was carried out for a predetermined time by maintaining the temperature in a low-temperature region in which $MgH_2$ exists in a thermodynamically stable state while the pressure in the atmosphere of hydrogen gas was kept constant. More specifically, in the first example, the first heat treatment was carried out by maintaining the temperature in the atmosphere of hydrogen gas at 550° C. for one hour and the second heat treatment was carried out by maintaining the temperature in the atmosphere of hydrogen gas at 400° C. for 20 hours while the pressure in the atmosphere of hydrogen gas was kept at 40 atms (4 MPa). FIG. 4 is a characteristic diagram showing the temperature and pressure conditions of the example in the equilibrium diagram shown in FIG. 1. The temperature and pressure conditions in the first example are indicated by black circles in FIG. 4.

Figure 5:
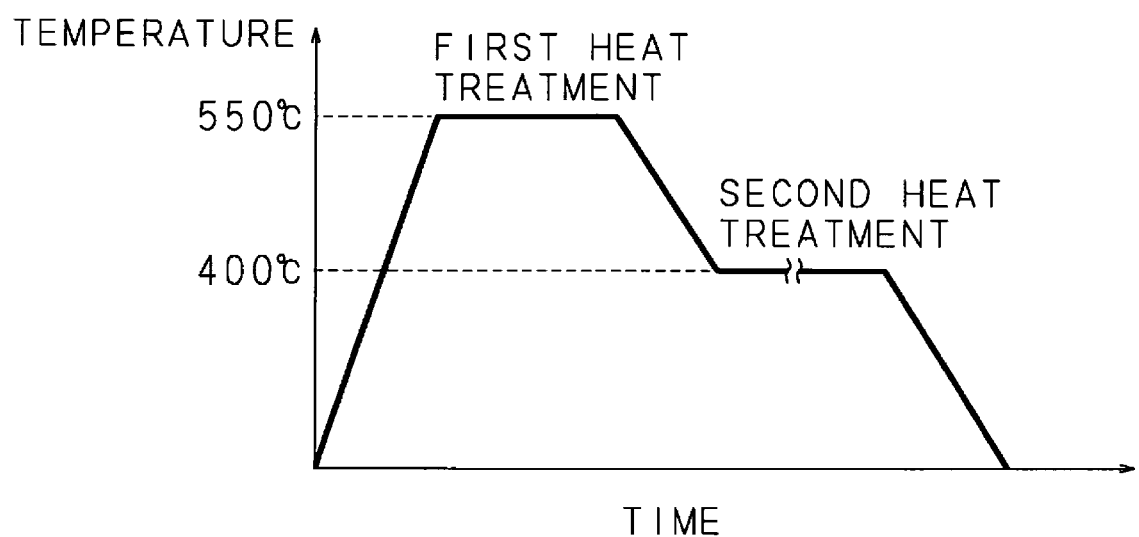
FIG. 5 is a characteristic diagram showing the thermal history of sample M1.
Figure 6:
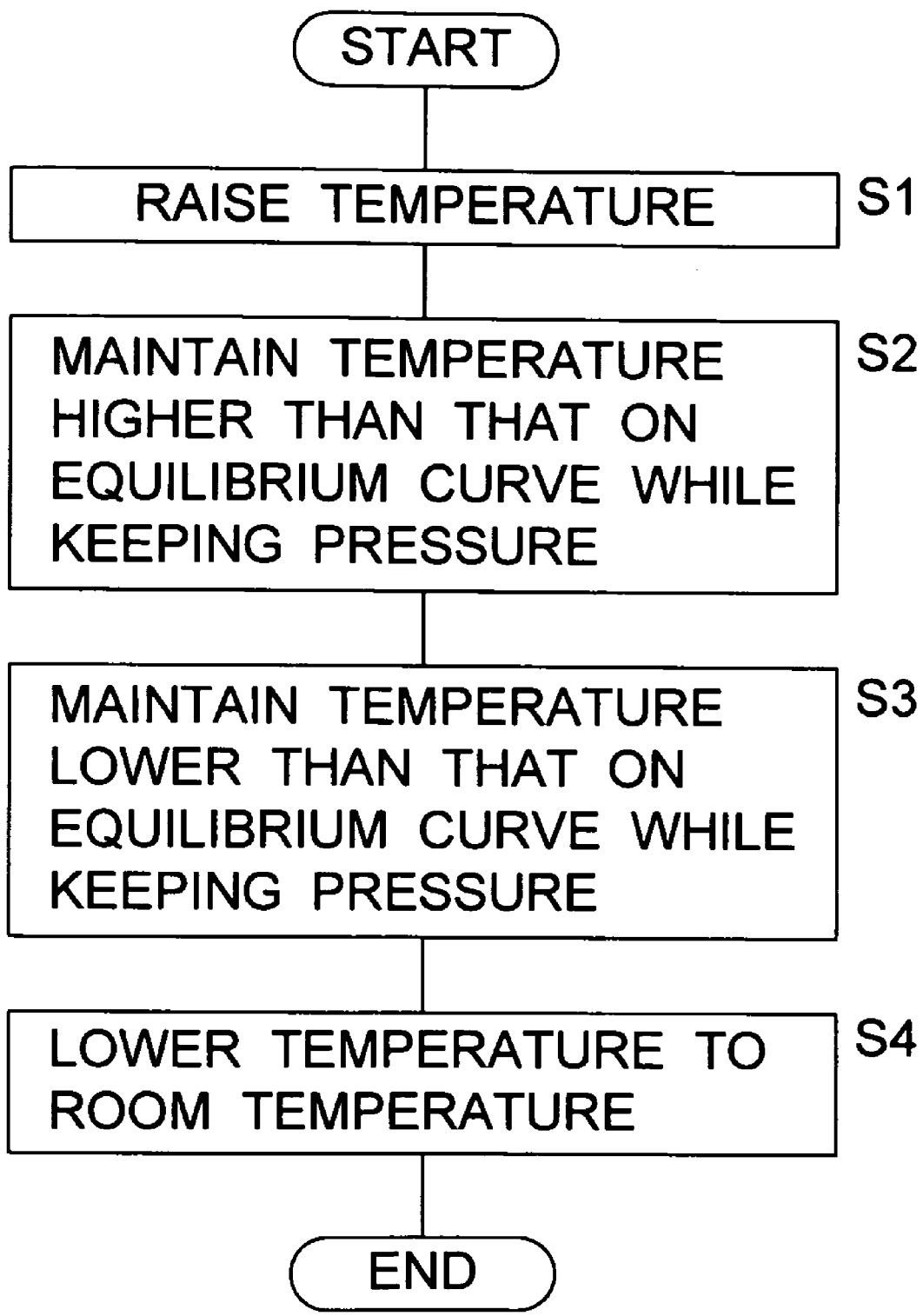
FIG. 6 is a flowchart showing the procedure of the treatment in the example.

As shown in FIG. 3, for sample M0, the first heat treatment was not carried out but only the second heat treatment was carried out. The treatment carried out for sample M0 corresponds to the treatment according to the related art. For sample M1, the first heat treatment was carried out and then the second heat treatment was carried out. FIG. 5 is a characteristic diagram showing the thermal history of sample M1, and FIG. 6 is a flowchart showing the procedure of the treatments in the example. While the pressure in the atmosphere of the hydrogen gas was kept at a constant pressure of 40 atms using the pressure controller 32, the temperature in the atmosphere of the hydrogen gas was raised from room temperature to 550° C. using the temperature controller 31 (at step S1). The first heat treatment was carried out in which the temperature in the atmosphere of hydrogen gas was set higher than the temperature corresponding to the pressure of 40 atms on the equilibrium curve using the temperature controller 31, 550° C., and maintained at 550° C. for one hour-(first period) while the pressure in the atmosphere of hydrogen gas was kept at 40 atms (at step S2). As shown in FIGS. 1 and 4, in the first heat treatment, the temperature-pressure region in which the temperature and pressure in the atmosphere of hydrogen gas are maintained is the region in which Mg and $H_2$ coexist in a thermodynamically stable state. Then, the second heat treatment was carried out in which the temperature in the atmosphere of hydrogen gas was set lower than the temperature corresponding to the pressure of 40 atms on the equilibrium curve using the temperature controller 31, 400° C., and maintained at 400° C. for 20 hours (second period) while the pressure in the atmosphere of hydrogen gas was kept at 40 atms using the pressure controller 32 (at step S3). As shown in FIGS. 1 and 4, in the second heat treatment, the temperature-pressure region in which the temperature and pressure in the atmosphere of hydrogen gas are maintained is the region in which $MgH_2$ exists in a thermodynamically stable state. When the temperature in the atmosphere of hydrogen gas is changed, the temperature is directly changed from 550° C. to 400° C. without returning the temperature in the atmosphere of hydrogen gas once to room temperature. Then, the temperature in the atmosphere of hydrogen gas was lowered to room temperature (at step S4). With these steps, the treatments for sample M1 were completed.

For sample M2, the first heat treatment and the second heat treatment were carried out as in the case of sample M1, and the mechanical grinding/mixing operation was carried out at room temperature after the second heat treatment and at a pressure of 1 MPa or more in the atmosphere of hydrogen gas. For sample M3, the first heat treatment, the second heat treatment and the mechanical grinding/mixing operation were carried out as in the case of sample M2, and then the first heat treatment and the second heat treatment were carried out for the second time. The thermal history of sample M3 in the first heat treatment and the second heat treatment carried out for the second time is similar to the thermal history shown in FIG. 5. Magnesium-based hydrides were produced from the material powders of the respective samples by carrying out the above-mentioned treatments.

FIG. 7 is a characteristic diagram showing the results of the X-ray diffraction analysis of the magnesium-based hydrides produced in the example. The horizontal axis of the diagram represents the angle 2θ formed between the incident X ray and the diffraction ray, and the vertical axis represents the intensity of the diffraction ray in arbitrary unit. The patterns shown in FIG. 7 respectively are the X-ray diffraction patterns of samples M1, M2 and M3 in this order starting from the bottom. The peaks indicated by arrows in the diagram are the peaks caused by $MgH_2$. In the case of the X-ray diffraction pattern of sample M0, the peaks caused by Mg appear, but the peaks caused by $MgH_2$ seldom appear. Hence, the pattern was omitted from FIG. 7. It is assumed that since the first heat treatment was not carrying out for samples M0, the reaction to form $MgH_2$ was suppressed by the coating of MgO or $Mg(OH)_2$ on the surface of Mg. In the X-ray diffraction patterns of samples M1 and M3, the peaks caused by $MgH_2$ appear intensely, indicating that $MgH_2$ was formed. Sample M2 became amorphous due to the mechanical grinding/mixing operation, and it is difficult to recognize the peaks caused by $MgH_2$ in the X-ray diffraction pattern. In the case of sample M3, it is assumed that although sample M3 became amorphous once by the mechanical grinding/mixing operation, it was recrystallized by the first heat treatment and the second heat treatment carried out for the second time.

Next, the amounts of $MgH_2$ contained in the magnesium-based hydrides of the respective samples were measured by simplified quantitative analysis from the results of the X-ray diffraction analysis. FIG. 8 is a table indicating the amounts of $MgH_2$ contained in the magnesium-based hydrides of the respective samples. The unit of the numerals in the table is wt %. It is assumed that the amount of $MgH_2$ contained in the magnesium-based hydrides of sample M0 is approximately 0 wt %. In addition, it was impossible to analyze sample M2 since it became amorphous. As the results of the simplified quantitative analysis, the amount of $MgH_2$ contained in the magnesium-based hydrides of sample M1 was 75.5 wt %, and the amount of $MgH_2$ contained in the magnesium-based hydrides of sample M1 was 97.0 wt %. As described later, it is assumed that the amount of $MgH_2$ contained in the magnesium-based hydrides of sample M0 is similar to those described above since the magnesium-based hydrides of samples M0 react with water and form hydrogen as in the cases of samples M1 and M3. In other words, it has become obvious that $MgH_2$ can be produced at high yield by carrying out the second heat treatment after the first heat treatment was carried out for Mg. In addition, it has also become obvious that the yield of producing $MgH_2$ from Mg can be made close to 100% by repeating the first heat treatment and the second heat treatment. Furthermore, by carrying out the mechanical grinding/mixing operation for the material powder in advance, hydrogen becomes easy to diffuse inside the material powder, and $MgH_2$ can be produced at high yield.

When the magnesium-based hydrides of samples M1, M2 and M3 were reacted with purified water, the reaction represented by the formula (2) proceeded promptly and hydrogen was generated. In particular, the magnesium-based hydrides of sample M2 reacted with water vigorously and generated hydrogen. In other words, it has become obvious that by carrying out the mechanical grinding/mixing operation for the produced magnesium-based hydrides, the reaction with water is activated, and the reaction rate of the reaction with water to generate hydrogen can be raised. Hence, it becomes possible to control the reaction rate of the reaction to generate hydrogen by adjusting the length of the time during which the mechanical grinding/mixing operation is carried out for the produced magnesium-based hydrides.

Next, a second example in which the temperature and pressure conditions for producing $MgH_2$ are changed will be described below. FIG. 9 is a table showing treatments carried out for samples in the second example. In the second example, $MgH_2$ was produced at 10 atms (1 MPa). Mg having a purity of 99.9 wt %, similar to that used in the first example, was mechanically ground and mixed to form a material powder with a grain size diameter smaller than that in the first example, and this material powder was used as the material powder in the second example. For sample N1, the first heat treatment was carried out in which the temperature in the atmosphere of hydrogen gas was set to and maintained at 410° C. for one hour (first period) using the temperature controller 31 while the pressure in the atmosphere of hydrogen gas was kept at 10 atms using the pressure controller 32. Next, the second heat treatment was carried out in which the temperature in the atmosphere of hydrogen gas was set to and maintained at 350° C. for 5 hours (second period) without returning the temperature to room temperature. Finally, a treatment for returning the temperature to room temperature was carried out. For sample N2, the first heat treatment was carried out under the same conditions as those of sample N1, and the second heat treatment was carried out in which the temperature in the atmosphere of hydrogen gas was set to and maintained at 350° C. for 7 hours. The temperature and pressure conditions in the second example are indicated by triangle marks in FIG. 4. When the purity of $MgH_2$ contained in the magnesium-based hydrides after the treatments was simply determined, the purity in sample N1 was 94%, and the purity in sample N2 was 95%.

As described above in the first and second examples, $MgH_2$ can be produced at high purity by maintaining the temperature in the atmosphere of hydrogen gas at a temperature higher than that on the equilibrium curve during the first period and then by maintaining the temperature at a temperature lower than that on the equilibrium curve during the second period while the pressure in the atmosphere of hydrogen gas containing the material powder is kept constant. Although the pressure in the atmosphere of hydrogen gas was set at 40 atms in the first example and at 10 atms in the second example, even when the pressure is set at 10 atms or more, for example, 20 atms, 30 atms or 50 atms, $MgH_2$ can be produced by carrying out similar treatments. However, when the pressure in the atmosphere of hydrogen gas is lower, the efficiency of producing $MgH_2$ becomes lower, the time required for the production of $MgH_2$ becomes longer, and the production of $MgH_2$ becomes substantially difficult. It is thus desirable that the pressure in the atmosphere of hydrogen gas for producing $MgH_2$ should be at least 6 atms, the lower limit of the pressure, to produce $MgH_2$ within a realistic time range. Although the upper limit of the pressure is not determined particularly, the pressure is required to be controlled to a pressure less than the limit of the withstand pressure of the sealing container 1.

In addition, even if the temperature in the atmosphere of hydrogen gas, being set so as to be higher or lower than that on the equilibrium curve while the pressure is kept constant, and the time during which the temperature is maintained have values other than those mentioned in the first and second examples, $MgH_2$ can also be produced. However, the temperature difference of the temperature in the atmosphere of hydrogen gas from the temperature on the equilibrium curve becomes larger, the heat loss that occurs when the temperature is changed becomes larger. It is thus desirable that the temperature difference from the temperature on the equilibrium curve should be at most within 100° C. (+100° C., −100° C.), preferably 10 to 30° C. Furthermore, it is desirable that the first period during which the temperature in the atmosphere of hydrogen gas is maintained at a temperature higher than that on the equilibrium curve should be one hour or more and that the second period during which the temperature in the atmosphere of hydrogen gas is maintained at a temperature lower than that on the equilibrium curve should be five hours or more. Although it is possible to produce $MgH_2$ even if the first and second periods are shorter than the above-mentioned values, the removal of the coating from the surface of the material powder becomes insufficient, and the reaction to from $MgH_2$ is done insufficiently, whereby the yield of $MgH_2$ lowers.

As described above in detail, a material powder comprising magnesium is kept in the atmosphere of hydrogen gas, and the temperature and pressure in the atmosphere of hydrogen gas are maintained in the temperature-pressure region in which Mg and $H_2$ coexist in a thermodynamically stable state, whereby the coating on the surface of Mg is removed. Next, the temperature and pressure in the atmosphere of hydrogen gas are changed and maintained in the temperature-pressure region in which $MgH_2$ exists in a thermally stable state, whereby Mg from which the coating is removed reacts promptly with $H_2$ and $MgH_2$ is produced at high yield. Hence, high purity $MgH_2$ can be obtained by supplying energy less than that required for the related art that requires the activation treatment in which the absorption and release of hydrogen are repeated by the repetition of heating and cooling. Furthermore, $MgH_2$ can be produced at high yield without adding substances other than Mg. As a result, the waste remaining after hydrogen is generated using the produced magnesium-based hydrides can be recycled easily.

In this embodiment, the treatments in the atmosphere of hydrogen gas containing the material powder are carried out under the condition in which the pressure is constant, that is, the first pressure and the second pressure are equal. However, the treatments in the atmosphere of hydrogen gas may be carried out under the condition in which the first pressure and the second pressure are different from each other or under the condition in which both the temperature and pressure are changed.

In addition, in this embodiment, an example in which almost pure magnesium is used as a material powder is described. However, the material powder is not limited to this kind of material powder. The material powder may be a material powder in which an alkaline earth metal or a transition metal is added to single magnesium. The material powder is produced by mixing the powder of an alkaline earth metal or a transition metal with the powder of magnesium. By using the material powder in which an alkaline earth metal or a transition metal is added to magnesium, the reaction rate of the reaction of the produced magnesium-based hydrides with water to generate hydrogen can be raised. For example, when a material powder in which 33 mol % of iron is added to magnesium is used, the reaction rate of the reaction to generate hydrogen can be improved 10% or more. Hence, it becomes possible to control the reaction rate of the reaction of the magnesium-based hydrides with water to generate hydrogen by adjusting the amount of the alkaline earth metal or transition metal to be added to magnesium.

Furthermore, the material powder may be a material powder to which carbon is added. By adding carbon to the material powder, the reaction rate of the reaction of the produced magnesium-based hydrides with water to generate hydrogen can be raised. Hence, it becomes possible to control the reaction rate of the reaction of the magnesium-based hydrides with water to generate hydrogen by adjusting the amount of the carbon to be added to the material powder.

Next, the removal of the nitride coating formed on metal Mg will be described below. In the case that a nitride of Mg is contained in the produced $MgH_2$, the nitride is converted to ammonia when $MgH_2$ is reacted with water to generate hydrogen. This ammonia is harmful to a fuel battery that uses hydrogen as a fuel. The nitride coating as well as the oxide coating is required to be removed in advance in order that the generated hydrogen is used as the fuel of the fuel battery.

However, it is known that even if a reduction treatment is carried out for metal Mg using hydrogen gas, the oxide coating and the nitride coating are difficult to remove effectively. The reactions in which the oxide and nitride of Mg are removed by hydrogen reduction are represented by the following chemical reaction formulas.

$$Mg_3N_2+3H_2 \rightarrow 3Mg+2NH_3 \quad (5)$$

$$Mg_3N_2+3H_2 \rightarrow 3MgH_2+N_2 \quad (6)$$

$$Mg_3N_2+6H_2 \rightarrow 3MgH_2+2NH_3 \quad (7)$$

$$MgO+H_2 \rightarrow Mg+H_2O \quad (8)$$

$$2MgO+2H_2 \rightarrow 2MgH_2+O_2 \quad (9)$$

The above-mentioned formulas (5) to (7) are chemical reaction formulas representing the reduction of the nitride, and the formulas (8) and (9) are chemical reaction formulas representing the reduction of the oxide. FIGS. 10 to 13 are tables showing the results of the theoretical calculations performed to obtain the free energy change ΔG and the equilibrium constant K in each reaction at each temperature. FIGS. 10, 11, 12 and 13 correspond to the reactions represented by the formulas (5), (6), (8) and (9), respectively. In the figures, T denotes temperature, ΔH denotes enthalpy change, and ΔS denotes entropy change. According to the results of the theoretical calculations shown in the tables, the ΔG values are positive values in all the reactions, indicating that the reactions are very difficult to proceed. In particular, the ΔG values of the reaction represented by the formula (9) and corresponding to FIG. 13 showing the results of the theoretical calculations are very large, and it is found that usually there is no likelihood that the reaction occurs.

As described above, it is difficult to effectively remove the oxide coating and the nitride coating. However, in this embodiment, it is possible to remove 20 to 70% of the nitride contained in the material metal Mg. The results of an experiment conducted to remove the nitride according to this embodiment will be described below.

In this experiment, powder sample E preserved for a long period and powder sample C preserved for a relatively short period were used as material powders formed of metal Mg. As the results of the analysis of nitrogen N in the samples, the N contents in powder sample E and powder sample C were obtained as described below.

Powder sample E: 33 ppm
Powder sample C: 8 ppm

Up to 7.7 wt % of hydrogen can be taken out from $MgH_2$ in which metal Mg is hydrogenated. It is possible to obtain up to 1860 ml of hydrogen gas at 25° C. when 1 g of $MgH_2$ is reacted with water according to the reaction represented by the formula (2).

In the experiment, $MgH_2$ was produced under the same conditions as those in the second example while powder sample E and powder sample C were used as material powders. Furthermore, the N content in $MgH_2$ was estimated by measuring the amount of ammonia generated when $MgH_2$ produced from each of powder sample E and powder sample C was reacted with water.

After the production of $MgH_2$, the inner atmosphere of the reaction system was replaced with argon gas, 0.1 g of the produced $MgH_2$ was reacted with water, and the generated hydrogen gas was passed through 40 ml of a water-sealed bath and recovered in a chamber.

The ammonia contained in the generated hydrogen gas was absorbed in the water-sealed bath, and the pH of the water inside the water-sealed bath changed. The pH inside the water-sealed bath was measured using a pH meter before and after the produced $MgH_2$ was reacted with water. The concentration of the hydroxide ions inside the water-sealed bath, that is, the concentration of the ammonium ions, was calculated on the basis of the change in the measured pH and the ion product of water, and the amount of N contained in the generated hydrogen gas was estimated from the concentration of the ammonium ions. In the calculation of estimating the amount of N, the calculation was performed on the assumption that 1860 ml of hydrogen gas is generated when 1 g of $MgH_2$ is reacted with water and that the volume of 1 mole of ammonia gas is 22.4 L.

FIG. 14 is a table showing the results of the experiment. The N content in Mg (A) is the N content in each of powder sample E and powder sample C described above. The maximum $NH_3$ concentration (B) in $H_2$ is the concentration of ammonia gas that is supposed to be contained in the hydrogen gas generated from the reaction between $MgH_2$ and water when the nitrogen contained in each of powder sample E and powder sample C before the experiment is entirely converted to $NH_3$. The value of B is a value that can be calculated from the value of A and corresponds to the amount of N contained in $MgH_2$ when the nitride is not removed at all.

The pH inside the water-sealed bath is a pH measurement value measured before and after the produced $MgH_2$ was reacted with water. The $NH_3$ concentration in $H_2$ (C) is a value obtained by calculating the concentration of ammonium ions on the basis of the change in the pH measurement value and by calculating the concentration of $NH_3$ contained in the generated $H_2$. The value of C corresponds to the amount of N actually contained in the produced $MgH_2$. The experiment was conducted twice for each of powder sample E and powder sample C, and B>C is established in each case. The amount (B−C) of the removed N is a value obtained by subtracting the value of C from the value of B and corresponds to the amount of N that was unable to be detected as $NH_3$ because the nitride was removed in the process of producing $MgH_2$.

The removal ratio ((B−C)/B) of N is the ratio of N that was unable to be detected as $NH_3$ with respect to the amount of N that was supposed to be detected as $NH_3$ when the nitride was not removed at all, and the removal ratio corresponds to the ratio of the nitride removed in the process of producing $MgH_2$. As indicated by the "removal ratio ((B−C)/B) of N" in FIG. 14, it is assumed that 20 to 70% of nitride can be removed when $MgH_2$ is produced. As described above, the nitride coating that was difficult to remove in the related art can be removed effectively from the surface of the material powder together with the oxide coating. Hence, it is possible to produce magnesium-based hydrides at high yield from the material powder from which the oxide coating and the nitride coating are removed.

For example, the second example according to the specification shows that $MgH_2$ having a purity of 95% can be produced from Mg by one time of treatment, and this shows that the material Mg stores approximately 7.8 wt % of hydrogen.

According to the above-mentioned embodiment, high purity $MgH_2$ can be obtained by supplying energy less than that required for the related art that requires the activation treatment in which the absorption and release of hydrogen are repeated by the repetition of heating and cooling. Hence, the energy to be supplied to produce magnesium-based hydrides can be reduced.

According to the above-mentioned embodiment, the yield of producing $MgH_2$ from Mg can be made close to 100% without adding substances other than magnesium. Hence, it becomes possible to obtain magnesium-based hydrides that generate hydrogen having a high density of up to 15.3 wt %. Furthermore, the waste remaining after hydrogen is generated using the produced magnesium-based hydrides can be recycled easily.

According to the above-mentioned embodiment, the material powder is mechanically ground and mixed in advance. This facilitates hydrogen to diffuse inside the material powder and improves the efficiency of the combination of Mg with $H_2$. As a result, $MgH_2$ can be produced at high yield.

According to the above-mentioned embodiment, the produced magnesium-based hydrides are mechanically ground and mixed. This activates the reaction between the magnesium-based hydrides and water and can raise the reaction rate of the reaction of the magnesium-based hydrides with water to generate hydrogen.

According to the above-mentioned embodiment, the length of the time during which the mechanical grinding/mixing operation is carried out for the material powder or the produced magnesium-based hydrides is adjusted. This makes, for example, the grinding/mixing time longer and the reaction rate higher, thereby being capable of controlling the reaction rate of the reaction to generate hydrogen.

According to the above-mentioned embodiment, a material powder in which an alkaline earth metal and/or a transition metal is added to single magnesium is used, and the amount of the alkaline earth metal or transition metal to be added is adjusted. This can control the reaction rate of the reaction of the magnesium-based hydrides with water to generate hydrogen.

According to the above-mentioned embodiment, the amount of carbon to be added to the material powder is adjusted. This can control the reaction rate of the reaction of the magnesium-based hydrides with water to generate hydrogen.

As this invention may be embodied in several forms without departing from the spirit of essential characteristics thereof, present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of producing magnesium-based hydrides comprising:
   keeping a material powder comprising magnesium in an atmosphere of hydrogen gas;
   removing a coating from a surface of said material powder by maintaining, for a first period, the temperature and pressure in said atmosphere of hydrogen gas in the temperature-pressure region in which the pressure is a first pressure and the temperature is set higher, by a temperature value in a first range, than the temperature corresponding to said first pressure on the equilibrium curve showing the equilibrium between the reaction in which single magnesium is combined with a hydrogen molecule to form magnesium hydride and the reverse reaction, wherein said first range is between the temperature corresponding to said first pressure and 100° C. higher than the temperature corresponding to said first pressure; and
   producing magnesium-based hydrides from said material powder by maintaining, for a second period, the temperature and pressure in said atmosphere of hydrogen gas in the temperature-pressure region in which the pressure is a second pressure and the temperature is not returned to room temperature but set lower, by a temperature value in a second range, than the temperature corresponding to said second pressure on said equilibrium curve, wherein said second range is between the temperature corresponding to said second pressure and 100° C. lower than the temperature corresponding to said second pressure.

2. The method of producing magnesium-based hydrides according to claim 1, further comprising:
   mechanically grinding/mixing said material powder in advance.

3. The method of producing magnesium-based hydrides according to claim 1, further comprising:
   mechanically grinding/mixing produced magnesium-based hydrides.

4. The method of producing magnesium-based hydrides according to claim 3, wherein further comprising:
   adjusting the length of the time during which said grinding/mixing is carried out to control the reaction rate of the reaction of the produced magnesium-based hydrides with water to generate hydrogen.

5. The method of producing magnesium-based hydrides according to claim 1, wherein
said material powder is a material powder in which an alkaline earth metal and/or a transition metal are added to single magnesium.

6. The method of producing magnesium-based hydrides according to claim 1, wherein
said material powder is a material powder to which carbon is added.

7. The method of producing magnesium-based hydrides according to claim 1, wherein
an oxide coating and a nitride coating on the surface of said material powder are removed.

8. A method of producing magnesium-based hydrides comprising:
keeping a material powder comprising magnesium in an atmosphere of hydrogen gas;
maintaining the pressure in said atmosphere of hydrogen gas at a predetermined pressure;
raising the temperature in said atmosphere of hydrogen gas from room temperature;
removing a coating from a surface of said material powder by maintaining, for a predetermined first period, the temperature in said atmosphere of hydrogen gas at a temperature higher by a first temperature value than the temperature corresponding to said predetermined pressure on the equilibrium curve showing the equilibrium between the reaction in which single magnesium is combined with a hydrogen molecule to form magnesium hydride and the reverse reaction, wherein said first temperature value is in the range between the temperature corresponding to said predetermined pressure and 100° C. higher than the temperature corresponding to said predetermined pressure; and
producing magnesium-based hydrides from said material powder by maintaining, for a predetermined second period, the temperature in said atmosphere of hydrogen gas at a temperature lower by a second temperature value than the temperature corresponding to said predetermined pressure on said equilibrium curve, without returning the temperature to room temperature, wherein said second temperature value is in the range between the temperature corresponding to said predetermined pressure and 100° C. lower than the temperature corresponding to said predetermined pressure.

* * * * *